United States Patent
Li (10) Patent No.: US 7,696,700 B2
(45) Date of Patent: Apr. 13, 2010

(54) SYSTEM FOR RECTIFYING AND LIMITING CURRENT AND REDUCING VOLTAGE

(75) Inventor: Zhaoyuan Li, Heyuan (CN)

(73) Assignee: Cindex Holdings Limited, Kowloon Bay (HK)

( * ) Notice: Subject to any disclaimer, the term of this patent is extended or adjusted under 35 U.S.C. 154(b) by 0 days.

(21) Appl. No.: 12/098,186

(22) Filed: Apr. 4, 2008

(65) Prior Publication Data

US 2008/0247207 A1    Oct. 9, 2008

(30) Foreign Application Priority Data

Apr. 6, 2007   (CN) .................... 2007 2 0143208 U (51) Int. Cl.
*H05B 37/00* (2006.01)

(52) U.S. Cl. .................. 315/185 R; 315/209 R; 315/291; 315/312

(58) Field of Classification Search ............ 315/106, 315/127, 158, 171, 175, 185 R, 200 R, 205, 315/207, 209 R, 219, 224, 225, 226, 227 R, 315/239, 240, 241 R, 242, 243, 244, 247, 315/276, 277, 291, 294, 307, 311, 360, 362, 315/411, DIG. 4, DIG. 5, DIG. 7; 363/15, 363/16, 17, 19, 20, 21.02, 21.04, 21.06, 21.08, 363/21.09, 21.11, 21.14, 21.15, 22, 26, 36, 363/37, 40, 44, 45, 46, 49, 50, 52, 53, 55, 363/56.01, 56.11, 60, 61, 71, 80, 82, 84, 363/86, 87, 89, 95, 97, 98, 124, 125, 126, 363/127, 128, 129, 131, 132, 133, 143, 146
See application file for complete search history.

(56) References Cited

U.S. PATENT DOCUMENTS

| 5,069,211 A * | 12/1991 | Bartelt et al. ............... 607/74 |
| 5,731,595 A * | 3/1998 | Clark ....................... 250/551 |
| 2005/0162101 A1* | 7/2005 | Leong et al. ............... 315/291 |
| 2006/0022607 A1* | 2/2006 | Hsu ......................... 315/209 R |

FOREIGN PATENT DOCUMENTS

| CN | 2045557 U | 10/1989 |
| CN | 2368209 | 3/2000 |
| CN | 2620959 | 6/2004 |
| CN | 201039025 | 3/2008 |
| CN | 201199738 | 2/2009 |
| JP | 7110720 | 4/1995 |

* cited by examiner

OTHER PUBLICATIONS

International Search Report of PCT Application No. PCT/IB2008/003411 dated May 7, 2009.

*Primary Examiner*—Douglas W Owens
*Assistant Examiner*—Jae K Kim
(74) *Attorney, Agent, or Firm*—Seyed Kaveh E. Rashidi-Yazd, Esq.; Ryan A. Schneider, Esq.; Troutman Sanders LLP (57) ABSTRACT

A system for reducing and limiting current and reducing voltage for a light string system. The system includes: an input terminal connected to a rectifying circuit; the rectifying circuit being connected between the input terminal and a voltage-reducing and current-limiting circuit; the voltage-reducing and current-limiting circuit being connected between the rectifying circuit and the input terminal; and an output terminal being connected to the device for rectifying current, reducing voltage and limiting current.

16 Claims, 5 Drawing Sheets

SYSTEM FOR RECTIFYING AND LIMITING CURRENT AND REDUCING VOLTAGE

CROSS REFERENCE TO RELATED APPLICATION

This application claims priority to Chinese (CN) Patent Application Ser. No. 200720143208.4 filed 6 Apr. 2007, under 35 U.S.C. § 119 and all the benefits accruing therefrom, the entire contents and substance of which is hereby incorporated by reference.

BACKGROUND

Aspects of the present invention relate to circuitry and, more particularly, to a system for rectifying and limiting current, as well as reducing voltage.

Conventionally, conversion from alternating current (AC) to direct current (DC) is implemented by (1) half-wave rectification through a rectifying bridge; (2) filtering through parallel-connected capacitors; or (3) rectification through a unilateral silicon-based circuit.

Rectification and current limitation must conventionally be implemented separately. For example, in case that there are several groups of parallel connections in a circuit of an light emitting diode (LED) product, it is necessary for each parallel connection to have resistors for current limiting, which is inconvenient for manufacturing.

Accordingly, conventional rectification requires high costs and is inconvenient in operation. Additionally, current limiting is integrated with the load, and can affect security. Moreover, the rectification and the current limitation must be separated from one another. This is inconvenient and difficult for quality controlling, and affects the overall appearance of the product.

SUMMARY

In one aspect, various embodiments of the present invention provide a system for rectifying and limiting current, and reducing voltage. The system is adapted to rectify current, reduce voltage, and limit current comprises an input terminal, a rectifying circuit, a voltage-reducing and current-limiting circuit, and an output terminal.

In one embodiment, the input terminal is connected to the rectifying circuit. The rectifying circuit is in communication with both the input terminal and the voltage-reducing and current-limiting circuit. In addition, the voltage-reducing and current-limiting circuit is in communication with the rectifying circuit and the output terminal. Ultimately, the output terminal is connected to a load for rectifying current, reducing voltage and limiting current.

The rectifying circuit can include four rectifying diodes. The voltage-reducing and current-limiting circuit can include a parallel connection circuit, which comprises more than one resistor. In an exemplary embodiment, the number of the resistors of the parallel connection circuit is dependent on the resistance of the load connected at the output terminal. The rectifying circuit is connected in series with the voltage-reducing and current-limiting circuit.

The system can further comprise a tail plug. The output power type of the tail plug can be dependent on the position of the tail plug, which is mounted on the system.

In addition, the system can be fixed on a circuit board or an insulation bracket. The system can be either molded by plastic shaping or be packaged by a plastic shell.

In various aspects of the present invention, costs associated with the systems can be saved over conventional solutions. In addition, security of the system can be improved, and the system can further have smaller footprint.

DETAILED DESCRIPTION

To facilitate an understanding of the aspects, principles, and features of the invention, it is explained hereinafter with reference to its implementation in an illustrative embodiment. In particular, aspects of the invention are described in the context of a system for rectifying and limiting current, as well as reducing voltage. In one aspect, the device and system is implemented in a light string system.

The system, however, is not limited to its use in a light string system. Rather, the system can be implemented when a smaller form factor and lower cost system for rectifying and/or limiting current is desired. As a result, the system described hereinafter can also find utility for other applications, beyond that of light string system.

Additionally, the materials described hereinafter as making up the various elements of the device and system are intended to be illustrative and not restrictive. Many suitable materials that would perform the same or a similar function as the materials described herein are intended to be embraced within the scope of various aspects of the system. Such other materials not described herein can include, but are not limited to, for example, materials that are developed after the development of the system.

Referring now to the figures, a system for rectifying and limiting current, as well as reducing voltage is described.

Figure 1:
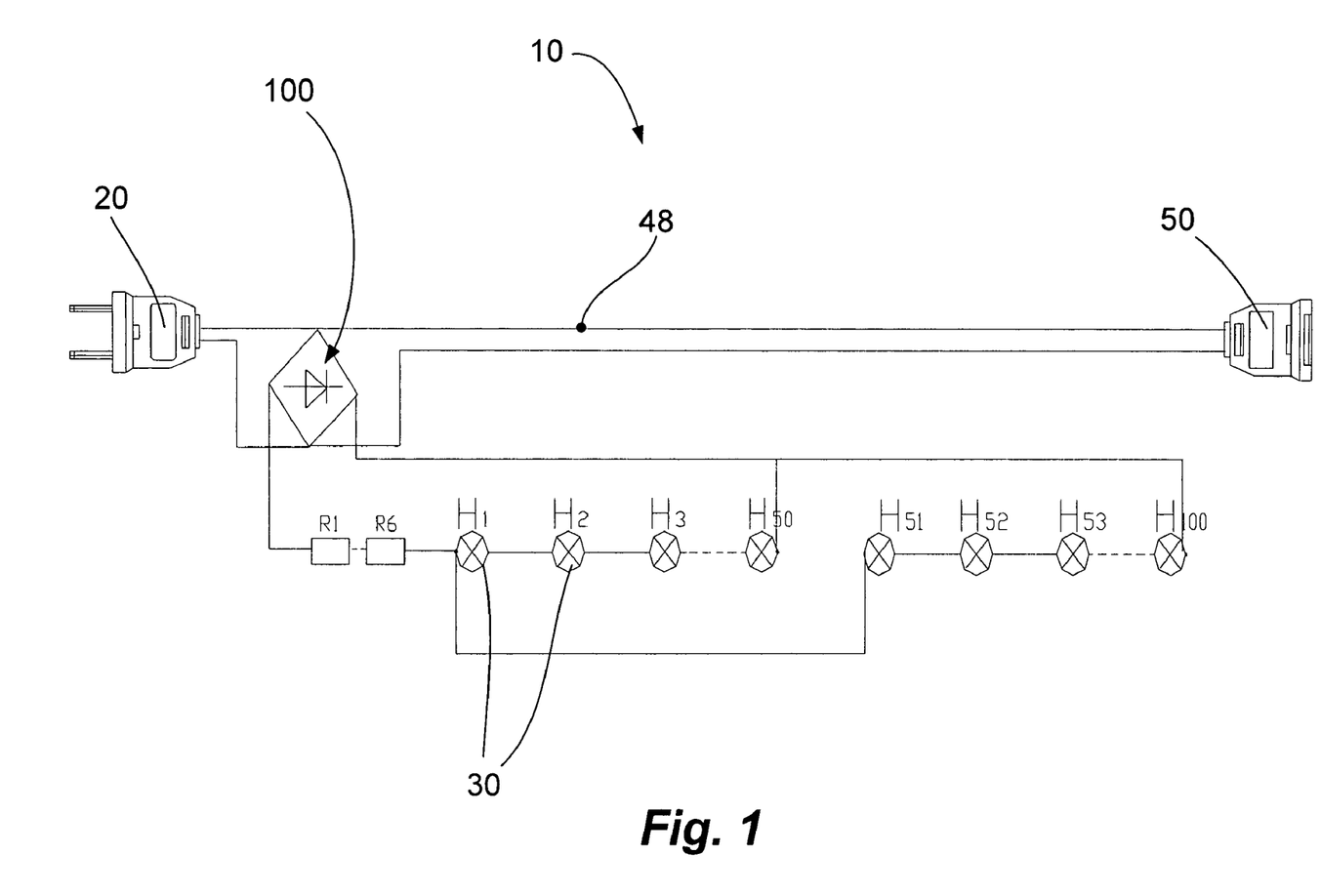
FIG. 1 is a circuit diagram of a light string system comprising a system for rectifying current, reducing voltage, and limiting current, in accordance with an exemplary embodiment of the present invention.

Referring initially to FIG. 1, a light string system 10 is shown. In an exemplary embodiment, the light sting system 10 includes an outlet plug 20, a plurality of lamp systems 30, an extension plug 50, and a system 100 for rectifying and limiting current, as well as reducing voltage.

The outlet plug 20 of the light string system 10 is insertable into a conventional wall outlet for providing energy, i.e., power, to the light string system 10 and for illuminating the lamp systems 30. The outlet plug 20 is preferably a male plug, which is receivable by the conventional female power outlet. In contrast, the extension plug 50 includes a female receptacle for receiving other male output plugs 20, such as other light string systems 10.

The light string system 10 comprises a plurality of lamp systems 30 electrically connected in series. The lamp systems 30, however, can also be electrically connected in parallel.

Figure 5:
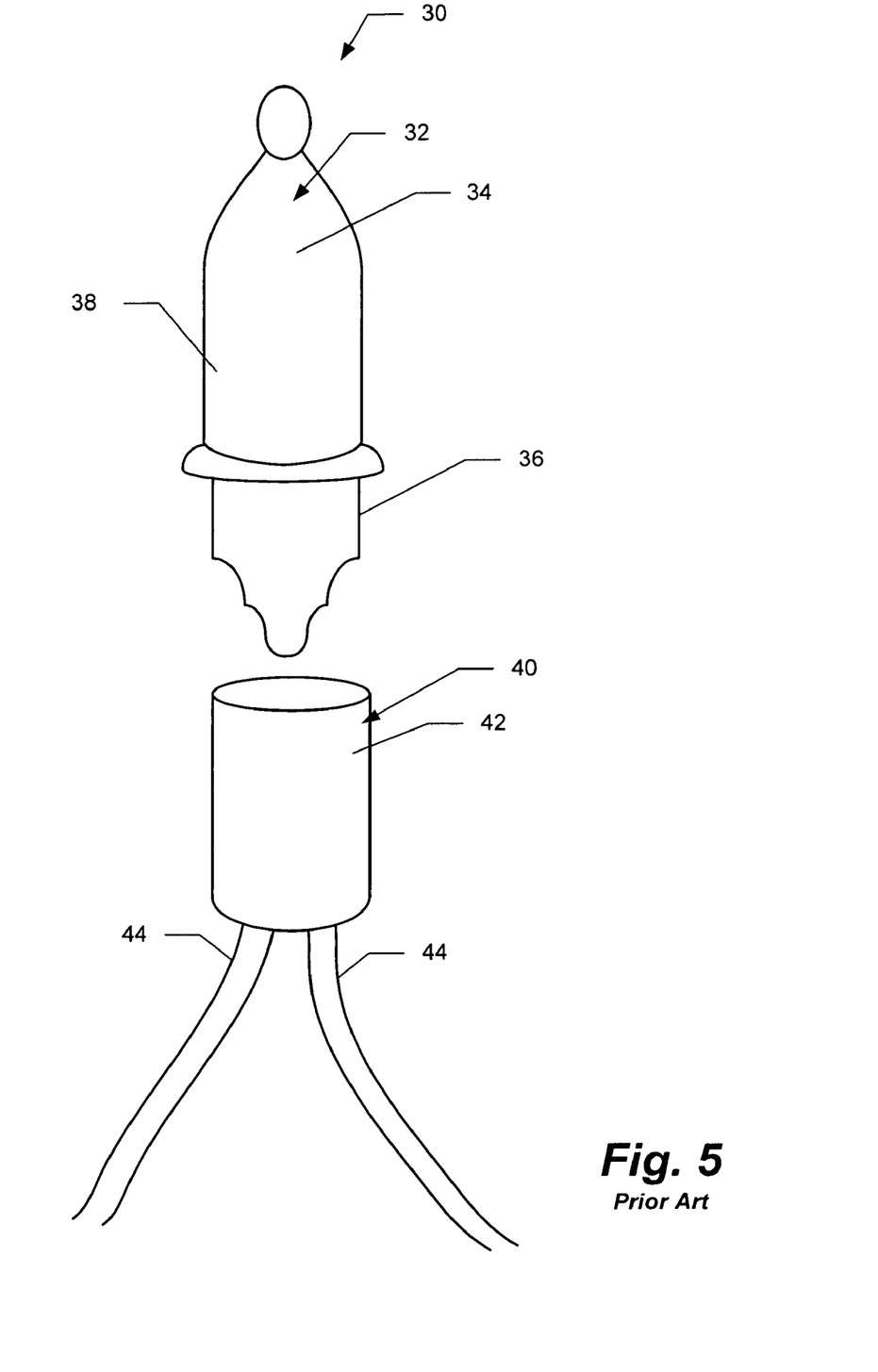
FIG. 5 is a side view of a conventional lamp system.

Various exemplary features of the lamp systems 30 are illustrated in FIG. 5. For instance, each lamp system 30 includes a light assembly 32 and a socket assembly 40. The light assembly 32 comprises a light source 34 and a base 36 in communication with the light source 36. The socket assembly 40 comprises a socket 42 adapted to receive the light assembly 32. Specifically, the socket 42 of the socket assembly 40 can receive the base 36 of the light assembly 32.

The light assembly 32 comprises the light source 34. The light source 34 provides light when energized. One skilled in the art can appreciate that the light source 34 can be many types of light sources, including a light bulb, light emitting diode (LED), incandescent lamp, halogen lamp, fluorescent lamp, and the like. Preferably, the light source 34 is an LED.

Additionally, the light source 34 of the light string system 100 can include a globe 38. Further, it can include a filament (not illustrated) that is protected by the globe 38. The globe 38 is in communication with, and terminates at, the base 36. The globe 38 can be made of conventional translucent or transparent material such as plastic, glass, and the like. Typically, the globe 38 includes a hollow interior enabling protection of the filament. When the light source 34 is charged with energy, it illuminates.

Each of the plurality of light sources 34 can be connected to one another in electrically in series or in parallel. This connection is made via wires or conductors 44.

Figure 2:
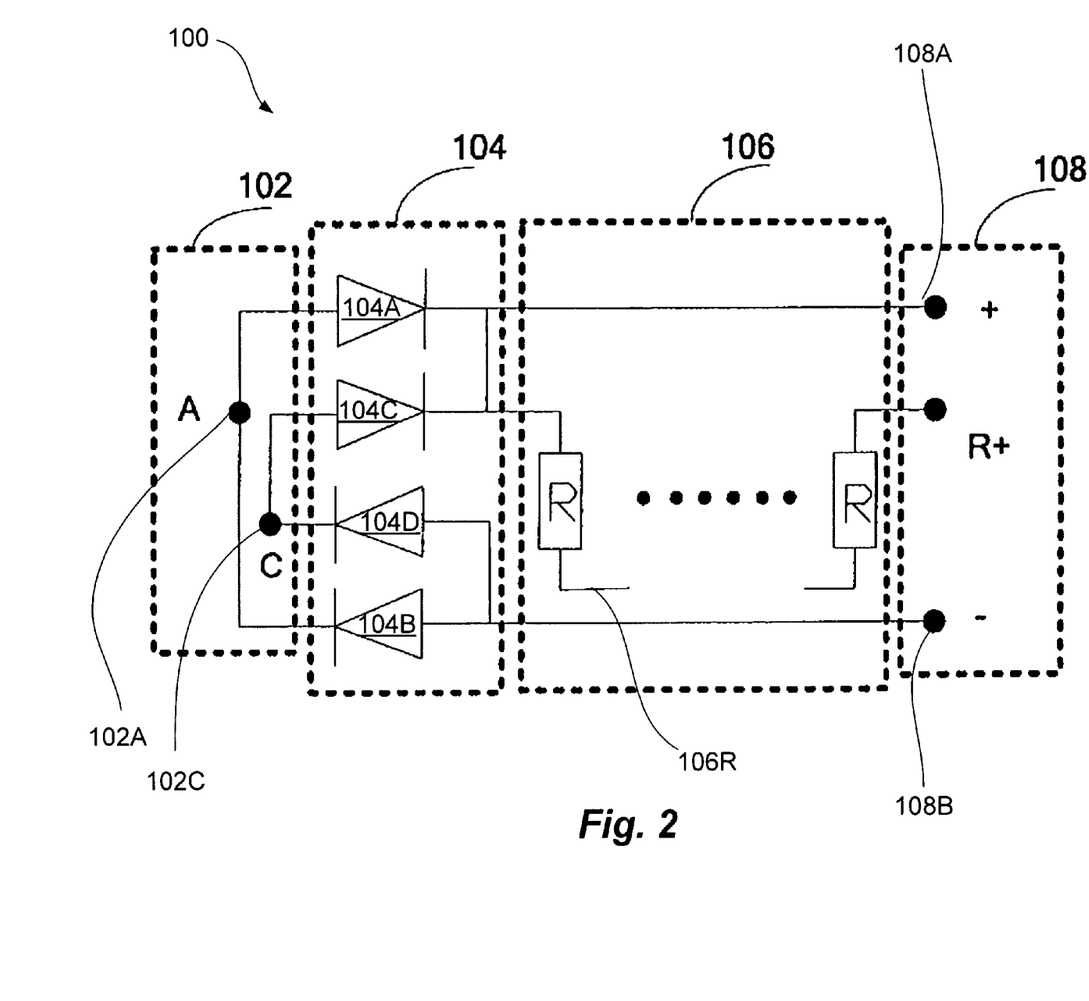
FIG. 2 is a circuit diagram of the system, in accordance with an exemplary embodiment of the present invention.

As shown in FIG. 2, the system 100 for rectifying and limiting current, as well as reducing voltage comprises an input terminal 102, a rectifying circuit 104, a voltage-reducing and current-limiting circuit 106, and an output terminal 108.

The input terminal 102 of FIG. 2 is in communication with the rectifying circuit 104. In addition, the rectifying circuit 104 can be in communication with both the input terminal 102 and the voltage-reducing and current-limiting circuit 106. In other words, the rectifying circuit 104 is coupled between the input terminal 102 and the circuit 106. Moreover, the voltage-reducing and current-limiting circuit 106 is in communication with both the rectifying circuit 104 and the output terminal 108. Specifically, the voltage-reducing and current-limiting circuit 106 is coupled between the rectifying circuit 104 and the output terminal 108. The output terminal 108 is connected to the device for rectifying current, reducing voltage and limiting current; for instance, the output terminal 108 is coupled to the light string system 10.

The system 100 of FIG. 2 can be connected to an alternating current (AC) power supply (see FIG. 1, outlet plug 20). For instance, this connection can be through the wire of a head plug, such that the input terminal 102 can be connected to the outlet plug 20. The rectifying circuit 104 of the system 100 is adapted to rectify an input current entering the system 100 from the input terminal 102. This rectification can occur by means of a plurality of rectifying diodes. As shown, the rectifying circuit 104 can include four rectifying diodes. The system 100 is adapted to reduce the voltage and limit the current of the rectified direct current (DC) power. This can be achieved by the voltage-reducing and current-limiting circuit 106. The voltage-reducing and current-limiting circuit 106 can comprise a number of resistor groups connected in series, which are coupled to the four rectifying diodes of the rectifying circuit 104. The voltage-reducing and current-limiting circuit 106 can supply the connected load (such as a LED light string system) with a stable power source. Notably, the number of the resistor groups of the voltage-reducing and current-limiting circuit 106 can be adjusted based on the resistance of the load (e.g., one or more LEDs) connected at the output terminal 108.

As one skilled in the art would appreciate, each diode includes an anode end (the positive side) and a cathode end (the negative side).

Still referring to FIG. 2, the input terminal 102 of the system 100 can include two inputs. A first input 102A of the input terminal 102 is coupled to a first diode 104A and a second diode 104B of the rectifying circuit 104. Specifically, the first input 102A is coupled to the anode end of the first diode 104A and the cathode end of second diode 104B. A second input 102C of the input terminal 102 is coupled to a third diode 104C and a fourth diode 104D of the rectifying circuit 104. Specifically, the second input 102C is coupled to the anode end of third diode 104C and the cathode end of fourth diode 104D. The cathode end of the first diode 104A is coupled to the cathode end of the third diode 104C and a first output 108A of the output terminal 108. The cathode ends of both the first and third diodes 104A and 104C are coupled to a resistor group 106R of the voltage-reducing and current-limiting circuit 106. Additionally, the anode ends of the second and fourth diodes 104B and 104D are coupled to one another and a second output 108B of the output terminal 108. The first output 108A is the positive output of the output terminal 108, and the second output 108B is the negative output of the output terminal 108.

In various applications, the system 100 can be fixed on a circuit board or an insulation bracket. Further, the system 100 can be molded by plastic shaping, or it can be packaged by a plastic shell to improve the security and reliability.

Each group of loads in several parallel connection groups does not need additional resistors to limit current because system 100 has functions of current-rectification, voltage-reduction and current-limitation, such that the cost of production is lowered and it is convenient for production operation. Moreover, when the voltage supplied rises abnormally, the system 100 can protect the load, whereby ensure the lifetime of the load (in one embodiment, one or more LEDs).

The system 100 can reduce voltage via resistance, after rectification of the input signal has occurred. Overpressure protection for system 100 occurs by adjusting the resistance level to reduce voltage and limit current, while also protecting the system. Even when the system 100 converts AC to DC, the extension plug (or tail) 50 still requires AC. The system 100 is connected to AC via the outlet plug 20, and can not use the main power line of the system 100. Additionally, the system provides an additional conductor 48 that enables AC power to flow from the outlet plug 20 to the extension plug 50.

Figure 3:
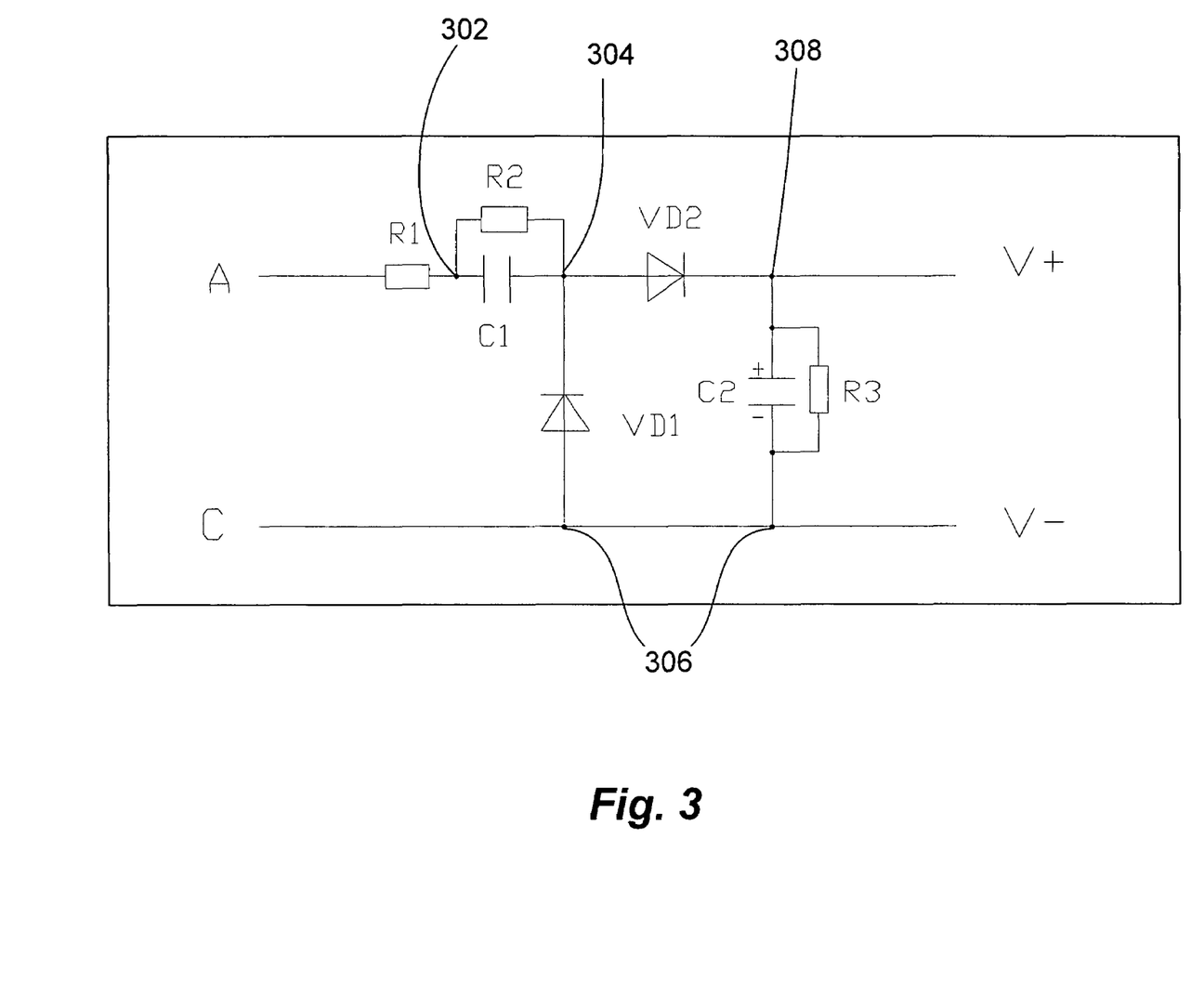
FIG. 3 is another circuit diagram of the system, in accordance with an exemplary embodiment of the present invention.
Figure 4:
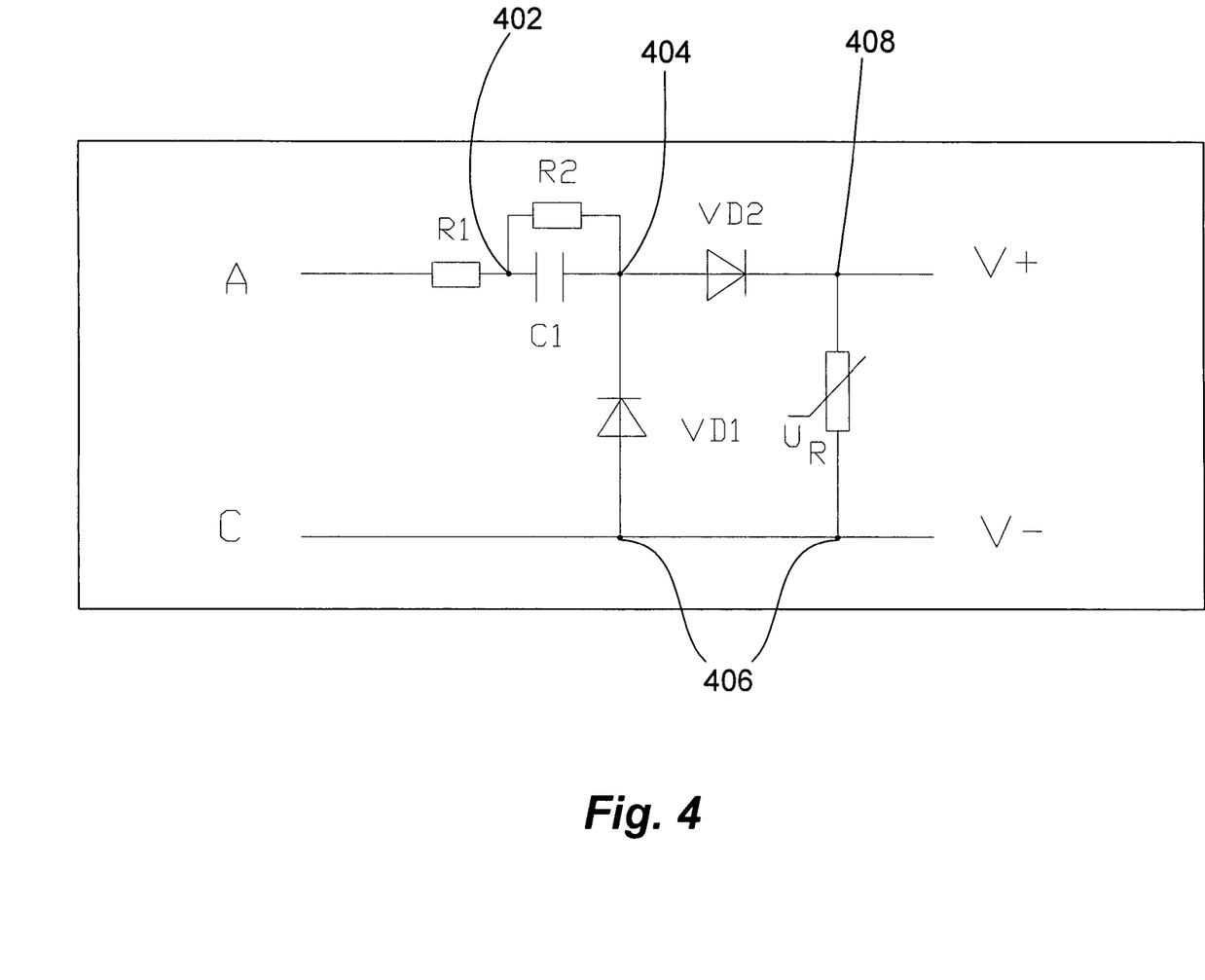
FIG. 4 is yet another circuit diagram of the system, in accordance with an exemplary embodiment of the present invention.

Referring now to FIGS. 3-4, various aspects of the system 100 are shown. In one embodiment, the system 100 can be adapted to reduce voltage based on capacitance voltage-reduction schemes.

In FIG. 3, overpressure protection comes via capacitance filtration by providing stable a power supply to the attached LEDs 30 in the light string system 10.

In one embodiment, the system 100 can comprise three resistors R1, R2, and R3, two capacitors C1 and C2, and two diodes VD1 and VD2. Additionally, the system 100 includes two inputs A and C, and two outputs V+ and V−.

As illustrated in FIG. 3, a first resistor R1 is coupled to both the first input A and a first node 302. A second resistor R2 and a first capacitor C1 are coupled electrically in parallel between both the first node 302 and a second node 304. A first diode VD1 is coupled to both the second node 304 and a third node 306. That is, the anode end of the first diode VD1 is coupled to the third node 306 and the cathode end of the first diode VD1 is coupled to the second node 304. Further, the third node 306 can be coupled to a second input C. A second diode VD2 is coupled to both the second node 304 and a fourth node 308. That is, the anode end of the second diode VD2 is coupled to the second node 304 and the cathode end of the second diode VD2 is coupled to the fourth node 308. A third resistor R3 and a second capacitor are positioned electrically in parallel to one another, and coupled between the fourth node 308 and the third node 306. Additionally, the fourth node 308 is coupled to the positive voltage output V+, and the third node 306 is coupled to the negative voltage output V−.

In operation, resistor R1 can prevent the damage to the circuit due to an instant oversupply of power during the start-up of the system 100. The remaining electric charge on the first and second capacitors C1 and C2 can not fully discharge. If, however, someone gets an electric shock, the second and third resistors R2 and R3 can discharge the remaining electric charge on the first and second capacitors C1 and C2 to ensure the safety of users and the circuit, itself. The remaining electric charge of the second and third resistors R2 and R3 are related to capacitance of the first and second capacitors C1 and C2. Generally, the larger the capacitance, the more the remaining electric charge, and hence the smaller the discharge. The voltage acceptance level of the first and second capacitors C1 and C2 is related to the load voltage, and can be approximately 1.2 times the load voltage. Additionally, the capacitance of the first and second capacitors C1 and C2 can be determined by the load voltage.

In an exemplary embodiment, the first resistor R1 is approximately ½ W and has a resistance of approximately 20-30Ω. The first and second resistors R2 and R3 are approximately ¼ W and have a resistance of approximately 2 k-5 kΩ. The first capacitor C1 is a metallic film capacitor, and has a capacitance of approximately 0.22μ-2 μF. The second capacitor C2 can be a polarity electrolyte capacitor, and the capacitance is related to the load on the system 100. Rectifying diodes VD1 and VD2 can be bridge rectifiers. In one aspect, rectifying diode VD1 can be Micro Electronics part no. IN-4004 and rectifying diode VD2 can be Micro Electronics part no. IN-4007.

In FIG. 4, overpressure protection comes via voltage-sensitive resistance, short-circuits jumping voltage, to protect the attached LEDs from sudden shock and thus prolong their lifespan.

In one embodiment, as illustrated in FIG. 4, the system 100 includes two resistors R1 and R2, one capacitor C1, two diodes VD1 and VD2, and a voltage sensor UR. Like the system illustrated in FIG. 3, the system 100 shown in FIG. 4 includes two inputs A and C, and two outputs V+ and V−.

A first resistor R1 is coupled to the first input A and a first node 402. A second resistor R2 and a first capacitor C1 are coupled between both the first node 402 and a second node 404. Hence, the second resistor R2 and the first capacitor C1 are positioned electrically in parallel with one another. A first diode VD1 is coupled to both a third node 406 and the second node 404. That is, the anode end of the first diode VD1 is coupled to the third node 406 and the cathode end of the first diode VD1 is coupled to the second node 404. Further, the third node 406 can be coupled to a second input C. A second diode VD2 is coupled between on opposing ends to the second node 404 and a fourth node 408. That is, the anode end of the second diode VD2 is coupled to the second node 404 and the cathode end of the second diode VD2 is coupled to the fourth node 408. The voltage sensor UR is coupled between the fourth node 408 and the third node 406. Additionally, the fourth node 408 is coupled to the positive voltage output V+, and the third node 406 is coupled to the negative voltage output V−.

In operation, the system 100 of FIG. 4, the voltage sensor resistance can discharge the instant pulse high voltage of the input power to the ground, therefore protect the load circuit.

In an exemplary embodiment, the first resistor R1 is approximately ½ W and has a resistance of approximately 20-30Ω. The second resistor R2 is approximately ¼ W and has a resistance of approximately 2 k-5 kΩ. The first capacitor C1 is a metallic film capacitor, and has a capacitance of approximately 0.22μ-2 μF. Rectifying diodes VD1 and VD2 can be bridge rectifiers. In one aspect, rectifying diode VD1 can be Micro Electronics part no. IN-4004 and rectifying diode VD2 can be Micro Electronics part no. IN-4007. Additionally, a voltage sensor UR is provided for over-voltage protection; the resistance of which is related to the load of the circuit.

In one aspect, the present invention includes a system for rectifying and limiting current and reducing voltage comprising. The system includes an input terminal connected to a rectifying circuit, the rectifying circuit being connected between the input terminal and a voltage-reducing and current-limiting circuit, the voltage-reducing and current-limiting circuit being connected between the rectifying circuit and the input terminal, and an output terminal being connected to a load.

The rectifying circuit can comprise four rectifying diodes. The voltage-reducing and current-limiting circuit comprises a parallel connection circuit comprising at least one resistor. Further, the number of the resistors of the parallel connection circuit can be dependent on the resistance of a load connected to the output terminal. The rectifying circuit is connected in series with the voltage-reducing and current-limiting circuit. The rectifying circuit rectifies an input current entering the input terminal, the rectifying circuit implementing at least four diodes to rectify the input current.

The system can further include the input terminal comprising a first input and a second input; and the rectifying circuit comprising a first diode, a second diode, a third diode, and a fourth diode, each diode comprising an anode end and a cathode end. Additionally, the system can include the first input of the input terminal coupled to the first diode and the second diode of the rectifying circuit; and the second input of the input terminal coupled to the third diode and the fourth diode of the rectifying circuit.

The first input is coupled to the anode end of the first diode and the cathode end of second diode. In addition, the second input is coupled to the anode end of third diode and the cathode end of fourth diode. Moreover, the cathode end of the first diode is coupled to the cathode end of the third diode and a first output of the output terminal. Also, the cathode ends of both the first and third diodes are coupled to a resistor group of the voltage-reducing and current-limiting circuit. The anode ends of the second and fourth diodes are coupled to one another and a second output of the output terminal. The load of the system can be a light string system.

In another aspect, the system includes an input terminal comprising a first input and a second input; a first resistor coupled to the first input and a first node; a second resistor and a first capacitor coupled electrically in parallel, the second resistor and the first capacitor coupled between both the first node and a second node; a first diode coupled to the second node and a third node; a second diode coupled to the second node and a fourth node; a third resistor and a second capacitor coupled electrically in parallel, the third resistor and the second capacitor coupled between both the third node and the fourth node.

In this system, the first diode comprises an anode end and a cathode end, wherein the anode end of the first diode is coupled to the third node and the cathode end of the first diode is coupled to the second node. Further, the second diode comprises an anode end and a cathode end, wherein the anode end of the second diode is coupled to the second node and the cathode end of the second diode is coupled to the fourth node.

In yet another aspect, the system includes an input terminal comprising a first and a second input; a first resistor coupled to the first input and a first node; a second resistor and a first capacitor coupled electrically in parallel, the second resistor and the first capacitor coupled between both the first node and a second node; a first diode coupled to both the second node and a third node; a second diode coupled to both the second node and a fourth node; and a voltage sensor coupled to both the third node and the fourth node.

In this system, the first diode comprises an anode end and a cathode end, the anode end of the first diode coupled to the third node and the cathode end of the first diode coupled to the second node. Further, the second diode comprises an anode end and a cathode end, the anode end of the second diode coupled to the second node and the cathode end of the second diode coupled to the fourth node.

In conclusion, the system provides current-rectification, voltage-reduction, and current-limitation, with compact structure, an aesthetically-pleasing appearance, low cost and ease of operation.

While the system has been disclosed in its exemplary forms, it will be apparent to those skilled in the art that many modifications, additions, and deletions can be made therein without departing from the spirit and scope of the invention and its equivalents, as set forth in the following claims.

What is claimed is:

1. A system for rectifying and limiting current and reducing voltage comprising:
    a first input terminal comprising a first input and a second input;
    a first resistor comprising a first end and a second end, the first end of the first resistor directly coupled to the first input of the input terminal;
    a second resistor comprising a first end and a second end;
    a first capacitor comprising a first end and a second end, the second end of the first resistor directly coupled to the first end of the second resistor and the first end of the first capacitor;
    a first diode comprising a first end and a second end, the first end of the first diode directly coupled to the second end of the second resistor and the second end of the first capacitor;
    a second capacitor comprising a first end and a second end;
    a third resistor comprising a first end and a second end, the second end of the first diode directly coupled to the first end of the second capacitor and the first end of the third resistor; and
    a second diode comprising a first end and a second end, the first end of the second diode directly coupled to the second end of the second resistor, the second end of the first capacitor, and the first end of the first diode, and the second end of the second diode directly coupled to the second end of the second capacitor and the second end of the third resistor.

2. The system of claim 1, the first end of the first diode consisting of an anode end and the second end of the first diode consisting of a cathode end.

3. The system of claim 2, the first end of the second diode consisting of a cathode end and the second end of the second diode consisting of an anode end.

4. The system of claim 1, the second input of the input terminal coupled to the second end of the second diode, the second end of the second capacitor, and the second end of the third resistor.

5. The system of claim 1, further comprising:
    a second input terminal comprising a third input and a fourth input;
    a rectifying circuit comprising a third diode comprising a first end and second end, a fourth diode comprising a first end and a second end, a fifth diode comprising a first end and a second end, and a sixth diode comprising a first end and second end; and
    an output terminal connected to a plurality of lamp systems of the light string system,
    the third input of the input terminal directly coupled to the first end of the third diode and the second end of the fourth diode,
    the fourth input of the input terminal directly coupled to the first end of the fifth diode and the second of the sixth diode,
    the second end of the third diode directly coupled to the second end of the fifth diode and a first output of the output terminal,
    the first end of the fourth diode directly coupled to the first end of the sixth diode and a second output of the output terminal,
    the second end of the fifth diode further directly coupled to the first input terminal.

6. The system of claim 5, the number of the plurality of resistors of the voltage-reducing and current-limiting circuit is dependent on the resistance of a load of the light string system.

7. The system of claim 5,
    the first end of the first diode comprising an anode end and the second end of the first diode comprising a cathode end,
    the first end of the second diode comprising an anode end and the second end of the second diode comprising a cathode end,
    the first end of the third diode comprising an anode end and the second end of the third diode comprising a cathode end, and
    the first end of the fourth diode comprising an anode end and the second end of the fourth diode comprising a cathode end.

8. The system of claim 5, the system for rectifying and limiting current and reducing voltage coupled in parallel across a plurality of lamp systems of the light string system.

9. A system for rectifying and limiting current and reducing voltage comprising:
    a first input terminal comprising a first input and a second input;
    a first resistor comprising a first end and a second end, the first end of the first resistor directly coupled to the first input of the input terminal;
    a second resistor comprising a first end and a second end;
    a first capacitor comprising a first end and a second end, the second end of the first resistor directly coupled to the first end of the second resistor and the first end of the first capacitor;
    a first diode comprising a first end and a second end, the first end of the first diode directly coupled to the second end of the second resistor and the second end of the first capacitor;
    a voltage sensor comprising a first end and a second end;
    the second end of the first diode directly coupled to the first end of the voltage sensor; and
    a second diode comprising a first end and a second end, the first end of the second diode directly coupled to the second end of the second resistor, the second end of the first capacitor, and the first end of the first diode, and the second end of the second diode directly coupled to the second end of the voltage sensor.

10. The system of claim 9, the first end of the first diode consisting of an anode end and the second end of the first diode consisting of a cathode end.

11. The system of claim 10, the first end of the second diode consisting of a cathode end and the second end of the second diode consisting of an anode end.

12. The system of claim 9, the second input of the input terminal coupled to the second end of the second diode and the second end of the voltage sensor.

13. The system of claim 9, further comprising:
a second input terminal comprising a third input and a fourth input;
a rectifying circuit comprising a third diode comprising a first end and second end, a fourth diode comprising a first end and a second end, a fifth diode comprising a first end and a second end, and a sixth diode comprising a first end and second end; and
an output terminal connected to a plurality of lamp systems of the light string system,
the third input of the input terminal directly coupled to the first end of the third diode and the second end of the fourth diode,
the fourth input of the input terminal directly coupled to the first end of the fifth diode and the second of the sixth diode,
the second end of the third diode directly coupled to the second end of the fifth diode and a first output of the output terminal,
the first end of the fourth diode directly coupled to the first end of the sixth diode and a second output of the output terminal,
the second end of the fifth diode further directly coupled to the first input terminal.

14. The system of claim 13, the number of the plurality of resistors of the voltage-reducing and current-limiting circuit is dependent on the resistance of a load of the light string system.

15. The system of claim 13,
the first end of the first diode comprising an anode end and the second end of the first diode comprising a cathode end,
the first end of the second diode comprising an anode end and the second end of the second diode comprising a cathode end,
the first end of the third diode comprising an anode end and the second end of the third diode comprising a cathode end, and
the first end of the fourth diode comprising an anode end and the second end of the fourth diode comprising a cathode end.

16. The system of claim 13, the system for rectifying and limiting current and reducing voltage coupled in parallel across a plurality of lamp systems of the light string system.

* * * * *